Patented Sept. 20, 1949

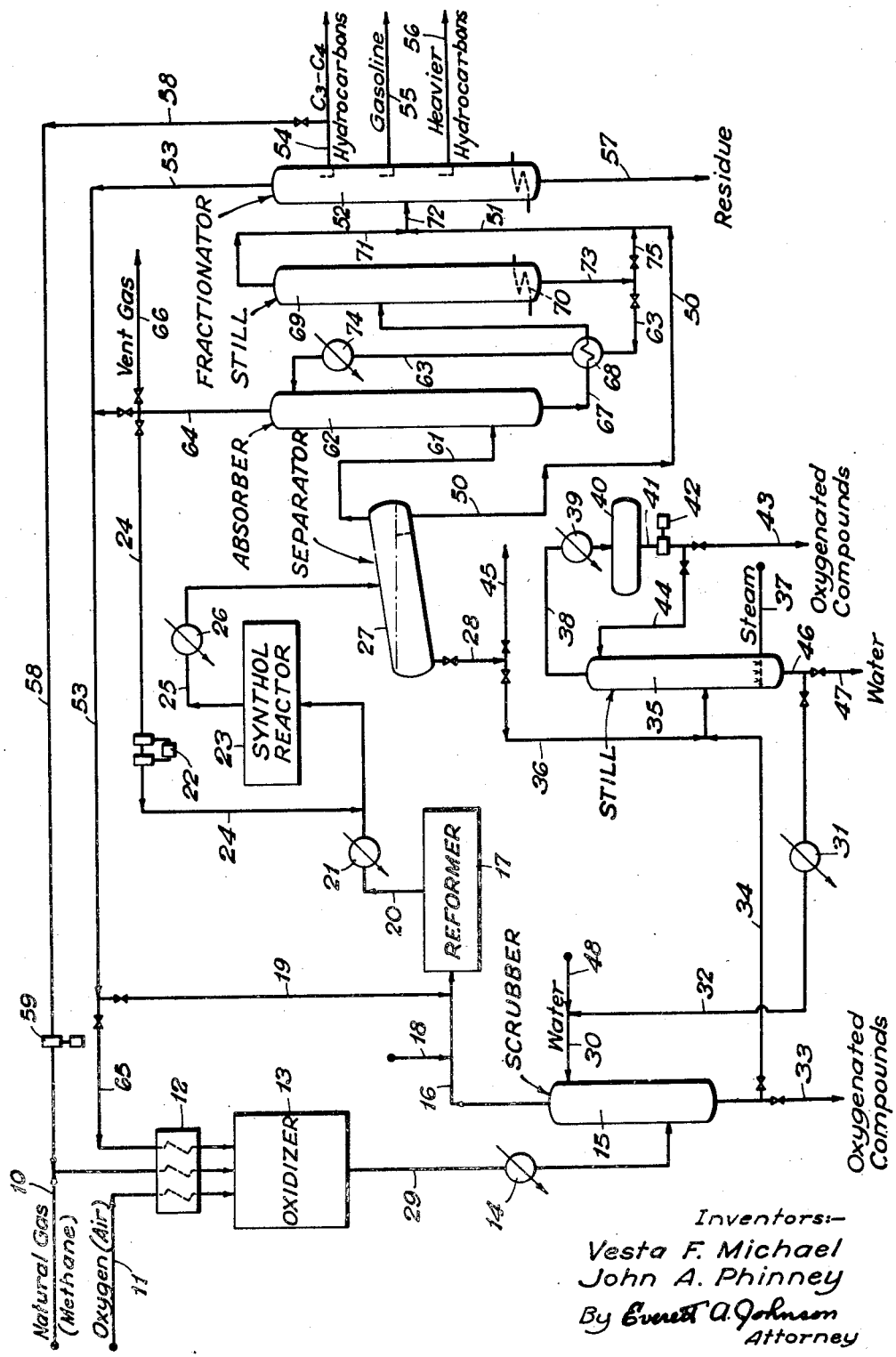

2,482,284

UNITED STATES PATENT OFFICE 2,482,284

PRODUCTION OF OXYGENATED COMPOUNDS AND LIQUID HYDROCARBONS FROM HYDROCARBON GASES

Vesta F. Michael and John A. Phinney, Tulsa, Okla., assignors to Stanolind Oil and Gas Company, Tulsa, Okla., a corporation of Delaware Application July 18, 1945, Serial No. 605,656

6 Claims. (Cl. 260—449)

This invention relates to the production of useful liquid hydrocarbons and oxygenated compounds from petroleum gases and it pertains more particularly to process and means for the partial oxidation of natural gas to produce oxygenated hydrocarbons and carbon monoxide, the separation and recovery of oxygenated hydrocarbons, the reforming of the residual gas mixture to produce a mixture of hydrogen and carbon monoxide, and the synthesis of hydrocarbons and oxygenated compounds from said hydrogen and carbon monoxide.

In the synthol process of producing hydrocarbons from carbon monoxide and hydrogen derived from natural gas, it has heretofore been required that the sulfur content of the natural gas be reduced below about 0.5 grain and preferably below about 0.2 grain per 100 cubic feet of gas. To effect this degree of desulfurization it has been necessary to employ expensive equipment in a preliminary desulfurization operation. It is an object of this invention to avoid such independent desulfurizing step and to effect desulfurization while producing useful products preliminary to the hydrocarbon synthesis. Another object of our invention is to provide a system wherein feed gases of relatively high sulfur content can be economically employed in the synthesis of hydrocarbons.

In the conversion of hydrogen and carbon monoxide with a catalyst to produce hydrocarbons having more than one carbon atom to the molecule, substantial proportions of oxygenated compounds are produced and it is an object of this invention to effect recovery and/or utilization of optimum quantities of the oxygenated compounds. It is a further object of this invention to provide an economical method and means for the conversion of sulfur-containing gas by a series of process steps to produce increased quantities of useful products. Another object is to minimize coking of hydrocarbons in preheating prior to reforming of gases. These and additional objects will become apparent to those skilled in the art as the detailed description of our invention proceeds.

The objects of our invention are attained by partial oxidation of natural gas, the recovery of valuable oxygenated compounds, the reforming of the unconverted natural gas to produce a synthesis gas mixture of hydrogen and carbon monoxide and the usilization of these products in the synthesis of hydrocarbons. The partial oxidation step can be carried out to produce a maximum quantity of oxygenated hydrocarbons without regard to the carbon monoxide produced since all the carbon monoxide can be used in the synthesis process. By this means an improved yield per pass of oxygenated hydrocarbons can be obtained. Sulfur compounds present in the feed gas to the partial oxidation step are converted therein to oxygenated sulfur compounds including sulfur dioxide which can be removed with the partial oxidation products. It is not necessary to recover the residual unconverted hydrocarbons as such from the partial oxidation step since these hydrocarbons may comprise the feed to the gas reforming step. Similarly the carbon monoxide produced in the partial oxidation passes through the reforming step and is supplied to the synthesis.

The invention will be more clearly understood from the following detailed description read in conjunction with the accompanying diagrammatic flow sheet which forms a part of this specification and which represents a schematic diagram of our improved process.

A methane-containing hydrocarbon gas such as natural gas can be introduced into the system through line 10 under pressure and oxygen or oxygen-containing gases can be introduced by line 11. The feed components are preheated separately in preheater 12, intimately mixed within reactor 13, and made to react therein. The preheating can be effected by heat exchange with product gases, for example, by exchanger 14. Ordinarily the air and/or hydrocarbon gases can be preheated separately to a temperature within the range of between about 225 and 650° F. In general when olefinic hydrocarbons are added to the feed, the lower preheat temperatures can be used. The temperature within the partial oxidation zone 13 is maintained between about 600 and 1000° F. in the absence of a catalyst and under a pressure of between about atmospheric and 300 pounds per square inch or higher. A pressure of about 100 pounds per square inch has been found to be satisfactory. The reaction time is short, being between about 0.05 and 2.0 seconds, for example, about 0.5 second.

Substantial proportions of oxygenated compounds can be obtained by the controlled oxidation of natural gas and added hydrocarbons such as $C_3$ and $C_4$ paraffins and olefins under conditions which produce no valuable products from natural gas alone. For example, air was separately preheated to 575° F. and a mixture of natural gas and a substantial proportion of propane was preheated to 650° F. The preheated mixture was reacted at 835° F. for a time of between about 0.4 and 0.45 second under a pressure of 100 pounds per square inch. The reaction yielded predominantly methanol, formaldehyde (recovered as 40% Formalin), and acetaldehyde together with smaller proportions of propylene oxide, acrolein, isopropyl alcohol, and n-propyl alcohol. In addition, substantial amounts of carbon monoxide were formed. In another run propylene was substituted for propane. The natural gas-propylene mixture and the air were separately preheated and reacted at 890° F. under reaction conditions similar to those used with propane to yield additional oxygenated compounds.

In a comparative test natural gas, without the addition of $C_3$ hydrocarbons, and air were separately preheated to 860° F. and reacted but no recoverable oxygenated compounds were produced. Substantially higher temperatures are necessary to effect the oxidation of natural gas alone and then the recovery of intermediate products is difficult.

The idealized yields of recoverable oxygenated compounds and carbon monoxide from the above runs are given below to illustrate the composition of the products from oxidizer 13. The unreacted hydrocarbons and the carbon monoxide are passed to the reformer after recovery of these compounds.

Table

|  | Weight Per Cent Based on Total Recoverable Oxygenated Compounds and Carbon Monoxide | |
| --- | --- | --- |
|  | Natural Gas-Propane-Air | Natural Gas-Propylene-Air |
|  | Per cent | Per cent |
| Acetaldehyde | 8.0 | 12.0 |
| Propylene Oxide | 3.0 | 6.3 |
| Acrolein | 7.0 | 10.7 |
| Methyl Alcohol | 22.5 | 11.4 |
| Isopropyl Alcohol | 3.5 |  |
| N-Propyl Alcohol | 4.0 |  |
| Allyl Alcohol |  | 7.6 |
| Formaldhyde | 22.0 | 25.0 |
| Carbon Monoxide | 30.0 | 27.0 |

The oxygenated compounds can be separated by condensation, absorption, or the like and in the illustrated embodiment the gases and vapors leaving the oxidizer 13 pass by line 29 through heat exchanger 14 and into the absorber 15 where the water soluble products are recovered by line 33. If desired, an accumulator or liquid separator can be placed in line 29 before the scrubber 15 to collect condensed water and acid compounds. By this means acid materials such as formic, acetic, or sulfurous acid do not enter the scrubber where they tend to hydrolyze propylene oxide.

The water introduced into the absorber 15 via line 30 may be cooled to a temperature of about 100° F., for example, by means of a heat exchanger 31 on line 32 and the product gases introduced at a low point into the absorber 15 by line 29 at a temperature of about 250° F. The rich water fraction can be transferred by line 34 to still 35 for the concentration of oxygenated compounds. The gaseous fraction withdrawn from the absorber 15 via line 16 can be supplied to the reformer 17 for processing as described herein and if desired additional quantities of oxidizing gas and/or hydrocarbon gas can be introduced via line 18. The gaseous fraction in line 16 comprises appreciable proportions of carbon monoxide which is supplied to the reformer 17 and thence to the synthesis reaction step.

When sour gas is employed as the feed to the primary oxidation zone 13 the recovered oxidation products will include sulfur compounds. It is contemplated that sodium carbonate might be added in controlled amounts to the water supplied to the absorber-scrubber 15 by line 30, the sodium carbonate reacting with sulfur dioxide to produce sodium bisulfite. This bisulfite can then react with the recovered aldehydes to produce a water soluble complex, the aldehydes then being recoverable with acid or base as is well known in the art.

In the reformer 17 the substantially sulfur-free gases are further reacted at temperatures of between about 1400 and 2200° F. and for such contact times that the products therefrom are essentially in equilibrium and contain hydrogen and carbon monoxide in the approximate ratio of between about 1 and 2 to 1 with less than 10% unreacted methane. A preferred catalyst is a group VIII metal or metal oxide which may be supported on a carrier such as an acid treated bentonitic clay, silica gel, clay, alumina, or the like. Nickel on alumina is particularly useful. Temperatures of between about 1400 and 1800° F. or higher; for example, a temperature of about 1600 may be used with a catalyst. However, when the reforming is effected thermally, temperatures of between about 1800 and 2200° F. are necessary.

Additional quantities of oxidizing gas or of hydrocarbons can be supplied by line 18 to the reformer as desired and recycle gases can be returned by line 19. In some operations it will be desirable to subject only a portion of the feed to partial oxidation and to supply a large portion of the reformer feed by line 18. The synthesis gas produced in the reformer 17 is transferred via line 20, passed through cooler 21 and supplied to the synthesis reaction zone 23.

This system allows maximum yields of useful oxygenated compounds to be obtained per pass without economic loss because a high percentage of the carbon reacted is converted to carbon monoxide which is suitable for feed in the synthol step. Likewise it permits a decrease in the quantity of oxygen or oxygen-containing gases required to convert the carbon in the residual gas to synthesis gas as compared with the same quantity of carbon feed in the form of methane. Additional advantages are the removal of sulfur compounds prior to the hydrocarbon synthesis and the reduction of coking of the feed.

Carbon dioxide and/or steam likewise can be used in the natural gas reforming or synthesis gas preparation step and the various gases can be employed in such proportions as to yield any desired ratio of hydrogen to carbon monoxide. The synthesis gas mixture contains between 1 and 3 mols and preferably about 1.5 to 1.7 mols of hydrogen per mol of carbon monoxide along with unavoidable diluents such as nitrogen and carbon dioxide. These diluents are relatively inert and are unobjectionable when present only in small amounts but if they are permitted to accummulate in any appreciable quantity the effective capacity of the reactor 23 will be materially reduced.

The hydrogen-carbon monoxide mixture, cooled to a temperature of about the synthesis temperature and in the approximate ratio of between about 1 to 1 and about 3 to 1, is passed via line 20 into the synthol reactor 23 along with any recycle gas from line 24 and compressor 22. The reactor 23 may operate under a pressure within the approximate range of between about 50 and about 500 or more pounds per square inch; for example, at about 200 pounds per square inch. A reaction temperature between about 225 and 650° F. can be used; for example, a temperature of about 600° F. when iron catalyst is used. With a cobalt-type catalyst the temperature is usually within the range of between about 225 and about 450° F.; for example, between about 350 and 400° F. About atmospheric pressure can be used with the cobalt-type catalyst but pressures as high as 10 atmospheres are contemplated.

The reactor 23 may be of the fixed, moving bed, or fluid type and in any case should be provided with means for abstracting the heat of synthesis to maintain the synthesis temperature within a relatively narrow range which will be optimum for the chosen catalyst and product distribution. The reactor of the so-called fluid type; i. e., one designed to maintain a finely divided catalyst in a dense suspended turbulent or liquid-like phase, is particularly useful.

Instead of employing a single reactor 23 we may provide a number of reactors in parallel or in series. When a single reactor or when a plurality of reactors in parallel is employed we prefer to recycle a large amount of the effluent gases, recycle ratios as large as 100 to 1 having been found to give excellent results. When the recycle is in the upper part of this range the space velocity with respect to fresh feed will, of necessity, be in the lower range for a given installation.

The hydrocarbon synthesis product stream is withdrawn from reaction zone 23 by line 25 and passed through cooler 26 which may be of the tube bundle type or countercurrent liquid scrubber type for effecting condensation of water formed in the synthesis step. The cooled products are introduced into separator 27 from which an aqueous liquid, a gaseous phase, and liquid hydrocarbons are recovered.

It has been found that a substantial proportion of the synthesis product comprises oxygenated compounds. These oxygenated compounds appear in the hydrocarbon liquids, in the water condensed from the reaction stream, and in gas streams beyond the liquid recovery. A substantial proportion of the recoverable oxygenated compounds is found in the condensed water, the water phase comprising between about 2 and 20 per cent or more of oxygenated compounds. These compounds have been identified as including among others: formaldehyde, acetaldehyde, acetone, methylethyl ketone, and methyl, ethyl, n-propyl and n-butyl alcohols.

The water phase can be withdrawn from the bottom of separator 27 via line 28 at a temperature of about 150° F. and may be increased in temperature by passing through a heat exchanger or other means (not shown) in line 36 and is introduced into stripper or still 35 at about 212° F. If desired the stripper 35 can be operated at a higher temperature and pressure. Steam is supplied via line 37 near the base of the stripper 35. The overhead from still 35, comprising oxygenated compounds and water, is withdrawn via line 38, passed through cooler 39 and into accumulator drum 40. The drum 40 can be operated at about atmospheric pressure and at a temperature of about 120° F. The condensate, comprising a solution of about 90 weight per cent of oxygenated compounds, is withdrawn via line 41, pump 42, and line 43. If desired a portion of the liquid can be returned as reflux to the stripper 35 via valve line 44 or can be used as the absorber liquid in 15 instead of the water in line 46.

The stream of oxygenated compounds and water in lines 45 and 23 can be treated by any method to recover the separate components as desired. Instead of steam stripping as a means of recovery of the oxygenated compounds in the aqueous phase other means may be used such as extraction with a suitable solvent or conversion of the alcohols present to the more volatile aldehydes and ketones and subsequent recovery of all aldehydes and ketones present by stripping or by the addition of sodium bisulfite to precipitate the compounds formed with regeneration of the aldehydes and ketones by the addition of acid. Maximum boiling mixtures with water may be formed and can k recovered as such.

Bottoms from stripper 35 is withdrawn via line 46 at about 212° F., net water being withdrawn by line 47. When water is used in absorber 15 to recover oxygenated compounds from the primary oxidation step 13 it can be supplied via lines 46, 32 and 30 as described above. When the temperature and pressure conditions within the stripper or still 35 are such that higher boiling compounds tend to build up in the water fraction withdrawn via line 46, these compounds can be recovered by a separate distillation.

Hydrocarbon liquids from separator 27 pass via lines 50 and 51 to the fractionator 52. The fractionator system is diagrammatically illustrated as a single column from which fixed gases are recycled via lines 53 and 19 to reformer 17, a normally gaseous hydrocarbon stream is withdrawn through line 54, a gasoline stream is recovered by line 55, a heavier hydrocarbon stream is withdrawn through line 56 and a residual hydrocarbon stream can be removed through line 57. It should be understood that any known type of fractionation and product recovery means can be employed and such means are contemplated by the schematic representation hereinabove set forth.

The addition of $C_3$ and $C_4$ hydrocarbons to natural gas enhances the practicability of the partial oxidation step by decreasing the temperature at which oxidation occurs and increasing the production of recoverable oxygenated hydrocarbon compounds. Hence, the normally gaseous hydrocarbons recovered by line 54 can be beneficially recycled to the partial oxidation step 13, line 58 and pump 59 being provided for this purpose. However, in the absence of the partial oxidation step, the added hydrocarbons tend to increase coking in the reformer.

If desired the liquid product fraction in line 50 from separator 27, which includes oil soluble oxygenated compounds, can be catalytically finished. For example, the product fraction can be heated to a temperature of between about 750 and 800° F. and contacted with a cracking catalyst to convert the oxygenated compounds to olefins. Such an operation does not effect any reforming or cracking and the octane number improvement results from the removal of the oxygenated compounds. However, this catalytic finishing can be conducted at a higher temperature of the order of about 975° F. which not only converts the oxygenated compounds to olefins but also effects reforming of the gasoline hydrocarbons and cracking of the heavier hydrocarbon product.

Gases from separator 27 can be introduced directly into the absorber 62 via line 61 and scrubbed with absorber oil introduced through line 63 for recovery of condensable hydrocarbons. However, water soluble oxygenated compounds can be removed from the hydrocarbon product fractions in lines 50 and 61 from separator 27. For example, the gaseous product fraction in line 61 can be subjected to a water scrubbing by a scrubber means (not shown) for the removal of the water soluble compounds prior to introducing the gaseous product fraction into the absorber 62. The oxygenated compounds so removed from the gaseous fraction can be recovered from the rich absorber medium in a manner similar to that described in connection with the oxygenated compounds from the partial oxidation and synthol water.

The unabsorbed gases which leave the top of the oil absorber 62 through line 64 can be recycled through line 24 to the hydrocarbon synthesis reactor 23, to the gas reforming step 17 by line 53, or to the partial oxidation step 13 by lines 53 and 65. Where air is used as the oxidizing gas, at least a part of the gas should be vented via line 66 to prevent nitrogen build-up in the system, but it should be understood that suitable means may be employed for separating nitrogen from the gases to be recycled in the system.

The rich absorber oil is withdrawn from absorber 62 via line 67 and passed through heat exchanger 68 to still 69 provided with heater 70. The overhead from the still 69 passes via lines 71 and 72 to fractionator 52. The bottoms from the still 69 can be returned via line 73 through heat exchanger 68, cooler 74, and line 63 to the top of the absorber 62. Another portion of the bottoms from the still 69 can be introduced via lines 75 and 51 into the fractionator 52. It should be understood that the absorber-still system is diagrammatic and idealized.

Although the oxygenated compound recovery is described as being accomplished by means of a water system employing an absorber and stripper, it should be understood that other means can be supplied for this duty. One such means is the oil absorber-still system described in connection with the recovery of hydrocarbons from the synthesis product stream wherein liquid fractions from lines 43 or 56 are used as the absorber medium. In some instances it will be satisfactory merely to cool the oxidation product in line 29 sufficiently to recover the higher boiling oxygenated and sulfur-containing compounds permitting the gaseous hydrocarbons and carbon monoxide to pass on into the reformer 17.

A specific embodiment of our invention has been described in considerable detail but it should be understood that this is by way of illustration and that the invention is not limited thereto since alternative modifications and operating conditions will be apparent from the above description to those skilled in the art. Such modifications and alternatives are contemplated as coming within the scope of the invention which is defined by the appended claims.

What we claim is:

1. The process for converting gaseous hydrocarbons into useful products which includes the steps of partially oxidizing the gaseous hydrocarbons at a temperature of between about 600 and 1000° F. to produce oxygenated compounds, residual gaseous hydrocarbons, and carbon monoxide, recovering oxygenated compounds from the product stream, reacting the residual gaseous hydrocarbons with an oxidizing gas to produce hydrogen and carbon monoxide, contacting the hydrogen and carbon monoxide mixture with a hydrocarbon synthesis catalyst to produce higher molecular weight hydrocarbons and oxygenated compounds, cooling the synthesis product and recovering a normally gaseous hydrocarbon fraction, a liquid hydrocarbon fraction, and a water fraction including oxygenated compounds, recovering oxygenated compounds from said water fraction to produce a residual lean water fraction, absorbing oxygenated compounds from said partial oxidation in at least a part of said water, supplying the rich absorber water to said oxygenated product recovery step, and supplying at least a portion of said normally gaseous hydrocarbons to said partial oxidation step.

2. The process for converting natural gas into oxygenated compounds and hydrocarbons having more than one carbon atom to the molecule which includes the steps of partially oxidizing the natural gas in the presence of added normally gaseous hydrocarbons, recovering water soluble oxygenated compounds from the products of said oxidation step by countercurrently contacting the gaseous oxidation products directly with liquid water, reforming residual gases with an oxidizing gas at a temperature of above about 1500° F. to produce a mixture of hydrogen and carbon monoxide, contacting the hydrogen and carbon monoxide mixture with a synthesis catalyst under synthesis temperature and pressure conditions to produce higher molecular weight hydrocarbons and oxygenated compounds, recovering from the synthesis products an unreacted gas fraction, a normally gaseous fraction predominating in hydrocarbons having three and four carbon atoms to the molecule, and a water fraction containing oxygenated compounds, stripping oxygenated compounds from the product water fraction, supplying a denuded product water fraction to said oxidation product recovery step, absorbing oxidation products with said product water fraction as an absorbent, returning the rich absorbent to the stripping step, recovering an oxygenated compound fraction from said stripping step, recycling at least a portion of said unreacted gas fraction to said synthesis step, and supplying to said partial oxidation step at least a portion of the normally gaseous fraction predominating in hydrocarbons having three and four carbon atoms to the molecule.

3. A process for converting methane into oxygenated compounds and hydrocarbons of higher molecular weight which includes the steps of subjecting the methane to a partial oxidation at a temperature of between about 600 and 1000° F. in the presence of added hydrocarbons of higher molecular weight, withdrawing oxidation products and unreacted methane from said oxidation step, recovering water soluble oxygenated compounds from the partial oxidation products by countercurrently contacting gaseous oxidation products directly with liquid water to produce a water fraction, reforming the residual methane with an oxidizing gas at a temperature of above about 1500° F. to produce a mixture of hydrogen and carbon monoxide, contacting the hydrogen and carbon monoxide mixture with a synthesis catalyst to produce higher molecular weight hydrocarbons and oxygenated compounds, recovering a liquid hydrocarbon fraction, a normally gaseous hydrocarbon fraction, and a water fraction containing oxygenated compounds, stripping at least one of the said water fractions with steam to remove oxygenated compounds therefrom, withdrawing a lean water fraction from said stripping step, supplying at least a portion of said lean water fraction to said oxidation product recovery step, recovering from said stripping step a concentrated water solution of oxygenated compounds, and supplying at least a portion of said normally gaseous hydrocarbon fraction to said partial oxidation step.

4. A process for the conversion of natural gas into more valuable products which comprises partially oxidizing natural gas in the absence of a catalyst, absorbing organic oxidized compounds from the oxidation products to produce a residual unreacted hydrocarbon gas fraction, catalytically reforming the residual gas fraction in a second oxidation stage to produce a gaseous mixture of hydrogen and carbon monoxide, reacting the gaseous mixture of hydrogen and carbon monoxide to produce hydrocarbons, oxygenated compounds and water, separating a water fraction from the synthesis products, stripping oxygenated compounds dissolved in said water fraction, withdrawing a concentrated stream of oxygenated compounds from said stripper, recovering a lean water fraction from said stripper and supplying at least a portion of the withdrawn lean water fraction to the first mentioned absorption step.

5. A process for the oxidation of natural gas which comprises supplying natural gas to an oxidation zone, oxidizing natural gas within said zone in the absence of a catalyst, withdrawing the reaction products from the oxidation zone, countercurrently contacting the total reaction products with an absorber medium, transferring unabsorbed reaction products to a catalytic contacting zone, reforming the unabsorbed reaction products in said catalytic contacting zone in the presence of an oxidizing gas to produce a mixture of hydrogen and carbon monoxide, charging said mixture to a synthesis zone containing a synthesis catalyst, withdrawing synthesis products from said synthesis zone and introducing them into a product separator, separately withdrawing hydrocarbon fluids and liquid water from said separation zone, fractionating the hydrocarbon fluids and recycling a fraction of said hydrocarbon fluids to the initial oxidation zone, introducing the synthesis water fraction and the rich absorber medium into a stripping zone, recovering a stripped water fraction from said stripping zone, accumulating a concentrated fraction of oxygenated compounds from said stripper and supplying at least a portion of said stripped water as said absorber medium in the countercurrent contacting step.

6. A process for converting gaseous hydrocarbons into useful products which includes the steps of partially oxidizing gaseous hydrocarbons in the absence of a catalyst to produce a first product stream containing organic oxygenated compounds, carbon oxides, and residual gaseous hydrocarbons, scrubbing the organic oxygenated compounds from said first product stream, reacting residual gaseous hydrocarbons in said scrubbed product stream with an oxidizing gas to produce hydrogen and carbon monoxide, reacting said hydrogen and carbon monoxide in the presence of a hydrocarbon synthesis catalyst to produce synthesis products comprising hydrocarbons, organic oxygenated compounds, and water, recovering from said synthesis products a liquid hydrocarbon phase, a gaseous hydrocarbon phase, and a first liquid water phase having oxygenated organic compounds dissolved therein, stripping organic oxygenated compounds from said separated water to produce a lean water fraction, scrubbing organic oxygenated compounds from said first product stream in at least a portion of said lean water fraction to produce a second liquid water phase having organic oxygenated compounds dissolved therein, supplying the said second liquid water phase to said stripping step, and supplying at least a portion of said gaseous hydrocarbon phase to the initial partial oxidation step.

VESTA F. MICHAEL.
JOHN A. PHINNEY.

REFERENCES CITED

The following references are of record in the file of this patent:

UNITED STATES PATENTS

| Number | Name | Date |
|---|---|---|
| 1,870,816 | Lewis | Aug. 9, 1932 |
| 1,976,760 | Lewis | Oct. 16, 1934 |
| 2,042,134 | Walker | May 26, 1936 |
| 2,132,968 | Penniman | Oct. 11, 1938 |
| 2,186,688 | Walker | Jan. 9, 1940 |
| 2,248,099 | Linckh | July 8, 1941 |
| 2,274,064 | Howard | Feb. 24, 1942 |
| 2,347,682 | Gunness | May 2, 1944 |